United States Patent
Bonneville et al.

(10) Patent No.: US 8,099,055 B2
(45) Date of Patent: Jan. 17, 2012

(54) METHOD AND DEVICE FOR MANAGING SIGNAL MEASUREMENTS IN A WIRELESS NETWORK

(75) Inventors: Hervé Bonneville, Acigne (FR); Bruno Jechoux, Biot (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 1033 days.

(21) Appl. No.: 11/414,399

(22) Filed: May 1, 2006

(65) Prior Publication Data
US 2006/0264179 A1 Nov. 23, 2006

(30) Foreign Application Priority Data

May 2, 2005 (EP) .................................. 05290959

(51) Int. Cl.
*H04B 17/00* (2006.01)
*H03C 1/62* (2006.01)
(52) U.S. Cl. ............... 455/67.11; 455/67.13; 455/115.1; 455/68; 455/423; 455/226.1
(58) Field of Classification Search ............... 455/67.11, 455/67.13–67.17, 68, 423, 226.1–226.4, 455/115.1–115.4
See application file for complete search history.

(56) References Cited

U.S. PATENT DOCUMENTS

| | | | | |
|---|---|---|---|---|
| 6,445,917 B1 * | 9/2002 | Bark et al. | | 455/423 |
| 6,671,495 B1 * | 12/2003 | Lappetelainen et al. | ... | 455/67.11 |
| 6,829,473 B2 * | 12/2004 | Raman et al. | ................. | 455/406 |
| 7,295,811 B2 * | 11/2007 | Stern-Berkowitz et al. | .... | 455/62 |
| 7,710,930 B2 * | 5/2010 | Kwak | ........................... | 370/338 |
| 2001/0031626 A1 * | 10/2001 | Lindskog et al. | ............ | 455/67.3 |
| 2002/0188723 A1 | 12/2002 | Choi et al. | | |
| 2005/0042987 A1 * | 2/2005 | Lee et al. | ................... | 455/67.11 |
| 2006/0128312 A1 * | 6/2006 | Declerck et al. | ........... | 455/67.11 |

OTHER PUBLICATIONS

"IEEE 802.11H: Amendment 5: Spectrum and Transit Power Management Extension in the 5 GHz band in Europe" IEEE STD 802.11H, XP-002292634, Oct. 14, 2003, pp. I-XIV and 1-59.

Jean Carle, et al., "Energy-Efficient Area Monitoring for Sensor Networks", IEEE Computer Society, XP-002347426, pp. 40-46.

* cited by examiner

*Primary Examiner* — Wen Huang
(74) *Attorney, Agent, or Firm* — Oblon, Spivak, McClelland, Maier & Neustadt, L.L.P.

(57) ABSTRACT

A wireless network comprises at least one station (102) adapted to perform measurements of at least one given type in the network, and a Centralised Measurement Manager (CMM) unit (101) for handling measurements of said type. CMM unit sends a measurement request message (201) requesting that this station (102) perform a measurement of the given type, this request message comprising a triggering information (304, 501, 601-602). Upon reception of the measurement request message (201), the station performs (202) a measurement and obtains (203) corresponding measurement result. Then, it is decided (204) whether at least part of the measurement results is to be sent to the CMM unit based on the triggering information. If yes, the station sends the corresponding part of the measurement result to the CMM unit.

12 Claims, 3 Drawing Sheets

| 301 | 302 | 303 | 601 | 602 |
|---|---|---|---|---|
| CHANNEL NUMBER | MEASUREMENT START TIME | MEASUREMENT DURATION | RPI_Level Th | RPI_Density Th |
| BYTES  1 | 8 | 2 | 1 | 1 |

| 301 | 302 | 303 | 304 |
|---|---|---|---|
| CHANNEL NUMBER | MEASUREMENT START TIME | MEASUREMENT DURATION | THRESHOLD MASK |

BYTES   1   8   2   1

FIG.3.

| 401 | 402 | 403 | 404 |
|---|---|---|---|
| BSS | OFDM | UNIDENTIFIED SIGNAL | RADAR |

BITS   0   1   2   3

FIG.4.

| 301 | 302 | 303 | 501 |
|---|---|---|---|
| CHANNEL NUMBER | MEASUREMENT START TIME | MEASUREMENT DURATION | CCA BUSY FRACTION THRESHOLD |

BYTES   1   8   2   1

FIG.5.

| 301 | 302 | 303 | 601 | 602 |
|---|---|---|---|---|
| CHANNEL NUMBER | MEASUREMENT START TIME | MEASUREMENT DURATION | RPI_Level Th | RPI_Density Th |

BYTES   1   8   2   1   1

FIG.6.

METHOD AND DEVICE FOR MANAGING SIGNAL MEASUREMENTS IN A WIRELESS NETWORK

BACKGROUND OF THE INVENTION

1. Technical Field

The present invention relates generally to communication networks, and more particularly to a method for managing signal measurements in a wireless network.

2. Related Art

Wireless networks are systems exposed to different kinds of transmission problems. When such problems occur, it is important to be able to take adapted action, such as modifying some transmission characteristics e.g., a transmission frequency or a transmission power level.

More precisely, a given transmission channel of a given system can disturb a different transmission channel of the same system or of another system. This type of problem can result, for instance, from the transmission power level being too high. Indeed, when data transmission on a given channel is performed with a too high transmission power level, data transmission performed on another channel can be disturbed.

Moreover, such a wireless network is generally expected to satisfy some regulatory requirements. Thus, for example, an operation in the 5 GHz band in Europe should be compliant with some regulatory requirements, in order to harmonize radio covering and interconnecting of different networks, regarding some transmission characteristics.

Consequently, in a wireless network, it is important to correctly adapt some transmission characteristics for a given data transmission in order to provide, notably, the data transmission with an expected transmission quality level and/or to make the data transmission in compliance with some regulatory requirements.

Such an adaptation can be based on signal measurements performed at station level. Classically, stations are able to perform such signal measurements on given transmission channels.

Some measurement schemes require a centralised management over the wireless network. For example, to obtain measurements corresponding to a noise level in the wireless network, it may be helpful to synchronize stations over the network in order to make stations not allowed to transmit during a determined period of time. Then, based on measurement of the noise level in the wireless network, it is possible to adapt some transmission characteristics, such as the transmission power level or the transmission frequency.

In a wireless network based on a centralised measurement architecture, generally, stations send measurement reports corresponding to the result of their measurement to a centralised entity. This step of sending these measurement reports to the centralised entity can consume an important transmission bandwidth, mainly if there are a lot of stations in the network which are expected to perform measurements Moreover, the consumption of transmission bandwidth increases when measurements are requested frequently in order to have measurement which are accurate in time.

Consequently, a step of sending measurement reports can result in high bandwidth consumption. In view of the foregoing, in a centralised measurement architecture, there is a need for providing measurements which are accurate in time for numerous stations, these measurements being performed in the wireless network at station level, while reducing bandwidth consumption linked to transmission of measurement reports.

SUMMARY OF THE INVENTION

In a first aspect, the invention thus proposes a method for managing signal measurements in a wireless network comprising at least one station adapted to perform measurements of at least one given type in the network, and a Centralised Measurement Manager (CMM) unit for handling such measurements.

The method comprises the following steps:
- CMM unit sending a measurement request message requesting the station to perform a measurement of the given type, the request message comprising a triggering information;
- upon reception of the measurement request message, the station performing a measurement of the given type and obtaining corresponding measurement results;
- deciding whether at least part of the measurement results is to be sent to the CMM unit based on the triggering information; and
- if yes, the station sending the corresponding part of the measurement results to the CMM unit.

The measurements of the given type can comprise measurements of different sub-types.

In this case, the triggering information refers to at least one sub-type selected out of the different sub-types. The station can decide to send to the CMM unit that part of the measurement results which corresponds to the selected sub-type.

In one embodiment, the triggering information comprises a binary mask including a plurality of bits, each of which being associated with one sub-type and indicating if the associated sub-type is to be considered to decide to send a measurement result or not.

In this case, for instance, the measurement result corresponding to a sub-type can be equal to 0 or 1. Thus, after performing such a measurement, it is possible to compare the corresponding result with the value of the associated bit in the binary mask. Then, a measurement result is sent to the CMM unit, when this result and the value of the associated bit in the binary mask are equal to 1.

The measurements can comprise a step of determining the time during which a given channel is busy within a given measurement time period. In this case, the triggering information further includes a threshold value. Thus, the station can decide to send to the CMM unit the corresponding measurement result based on a comparison between the threshold value and the corresponding measurement result.

The type of measurement can comprise a step of computing one density level for each one of a plurality of ranges of power values. In this case, the triggering information further includes a threshold density value and a threshold number.

Then, the station computes a sum value by summing selected computed density levels while the sum value is less than or equal to the threshold density value, the summed computed density levels being selected out of the computed density levels according to a given rule. Thus, the station can decide whether to send to the CMM unit the corresponding measurement result based on a comparison between the number of the summed density levels and the threshold number.

When the ranges of power values are sorted in increasing order of power values, the density levels which are summed can be selected out of the computed density levels starting from the density level corresponding to the highest range of power values and going down through the ranges of power values while the sum value is less than or equal to the threshold density value.

The measurement request message can further include an information which indicates a transmission channel on which the measurement is to be performed, a measurement start time and a measurement time period.

When the wireless network is adapted to manage measurements of a plurality of types, the request measurement message can include a measurement type identification which indicates one type of measurement selected out of the plurality of types.

The wireless network may be based on the 802.11h protocol, standardized by IEEE.

The CCM unit can be co-located with the station.

A method such as defined above allows the CMM unit to request performing measurement on stations, while limiting the quantity of information sent from stations to the CMM unit to relevant one only, based on the triggering information. Thus, when a station has performed the requested measurement, this station is able to decide if none, some or all information is to be sent to the CMM unit, such decision being performed based on the triggering information. Consequently, when some conditions are not satisfied, stations can decide to avoid sending the measurement results.

Thus, it is possible to have an accurate view of a quality level in the network while limiting the bandwidth consumption linked to the measurement results transmission.

A second aspect of the present invention proposes a station adapted to cooperate with a Centralised Measurement Manager (CMM) unit in order to manage measurements in a wireless network.

The station comprises:
an interface unit adapted to receive a measurement request message indicating a type of measurement and comprising a triggering information;
a measurement unit adapted to perform a measurement of indicated type and provide a corresponding measurement result, upon reception of the measurement request message,
a decision unit adapted to decide whether at least part of the measurement result is to be sent to the CMM unit based on the triggering information, and, if yes, adapted to handle sending the corresponding part of the measurement result to the CMM unit.

The measurement unit can be adapted to perform measurements comprising measurements of different sub-types. In this case, the triggering information can refer to at least one sub-type selected out of the different sub-types. Moreover, the decision unit can be adapted to decide to send to the CMM unit that part of the measurement result which corresponds to the selected sub-type.

In one embodiment, the measurement unit is adapted to perform measurements comprising a step of determining the time during which a given channel is busy for within a given measurement time period. In this case, the decision unit is adapted to decide to send to the CMM unit the corresponding measurement result based on a comparison of a threshold value indicated in the triggering information and the corresponding measurement result.

In one embodiment, the measurement unit is adapted to perform measurements comprising a step of computing one density level for each of a plurality of ranges of power values, the triggering information indicating a threshold density value and a threshold number.

In this case, the measurement unit can compute a sum value by summing selected computed density levels while the sum value is less than or equal to the threshold density value, the summed computed density levels being selected out of the computed density levels according to a given rule. Thus, the decision unit can be adapted to decide to send the corresponding measurement result based on a comparison between the number of summed density levels and the threshold number.

The measurement unit can be adapted to perform measurements on a given transmission channel, starting the measurements at a given start time and during a given time period, the given transmission channel, the given start time and the given time period being indicated in the request measurement message.

A third aspect of the present invention proposes a Centralised Measurement Manager (CMM) unit adapted for handling a measurement in a wireless network comprising at least one station adapted to perform measurements of at least one given type in the network. This CMM unit comprises an interface unit adapted to send a measurement request message to the station in order to request a measurement of the given type to provide a corresponding measurement result. The request message comprises a triggering information based on which the station can decide whether at least part of the corresponding measurement result is to be sent to the CCM unit.

A fourth aspect of the present invention proposes a system for managing measurement in a wireless network comprising at least one station according to the second aspect of the present invention and a Centralised Measurement Manager (CMM) unit according to the third aspect of the present invention.

BRIEF DESCRIPTION OF THE DRAWINGS

Further features and advantages of the present invention will become more apparent from the description below. The latter is given purely by way of illustration and should be read in conjunction with the appended drawings, of which:

FIGS. 3-6 illustrate a request measurement message format according to one embodiment of the present invention;

DESCRIPTION OF PREFERRED EMBODIMENTS

The present invention proposes a method for managing signal measurements in a wireless network, a station and a Centralised Measurement Management to carry out such a method.

Figure 1:
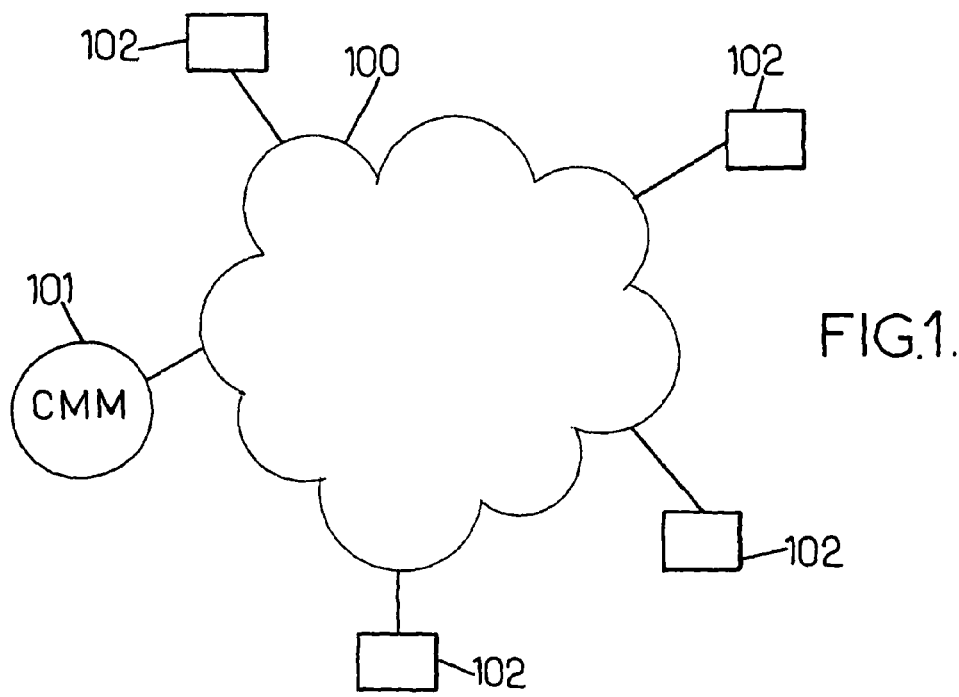
FIG. 1 illustrates a wireless network according to one embodiment of the invention.

FIG. 1 illustrates a wireless network 100 according to one embodiment of the present invention comprising a plurality of stations 102 and a CMM unit 101. Such a network preferably comprises a centralised entity to handling measurement purpose in order to be able to synchronise the triggering of measurement on different stations in the network.

One embodiment of the present invention is in the context of a wireless network comprising stations including a communication protocols stack based on the 802.11 standard defined by the Institute of Electrical and Electronics Engineers, known as IEEE. In the wireless network 100, the CMM unit 101 is in charge of centralising the measurement results in order to take decision regarding the transmission characteristics in the network.

Of course the scope of the invention encompasses applications to any stack of communication protocol layers, as well as applications to other types of networks. However, for the sake of better understanding, the following description is applied to a network based on the 802.11 standard of IEEE. More precisely, the following description is applied to a network based on the 802.11h of IEEE, dated 14 Oct. 2003.

This latter standard corresponds to an adaptation of the 802.11 standard to European standard regarding electromagnetic transmitting. IEEE 802.11h is an amendment to IEEE 802.11 standard aiming at defining the necessary protocol for a system to get Transmit Power Control (TPC) and Dynamic Frequency Selection (DFS) capabilities. TPC capability limits the transmitted power to the minimum needed to ensure a sufficient received power for the destination user. DFS selects the radio channel at the access point to minimize interference with other systems, particularly radar systems.

The CMM unit can be implemented with/in any type of entity in the network by software and/or by hardware. For instance, the CMM unit can be implemented with/in an Access Point or, generally, on any station. Preferably, the CMM unit is in charge of requesting one station or a group of stations to make signal measurements.

Based on the measurement results, it is possible to take appropriate action like frequency switch if interference level is considered as very high for example, or if primary users of the radio band, such as radars, are detected.

Generally, the wireless network comprises a plurality of cells. In this case, preferably, one CMM unit is dedicated to one given corresponding cell in order to manage measurement of stations which are located in the cell.

Figure 2:
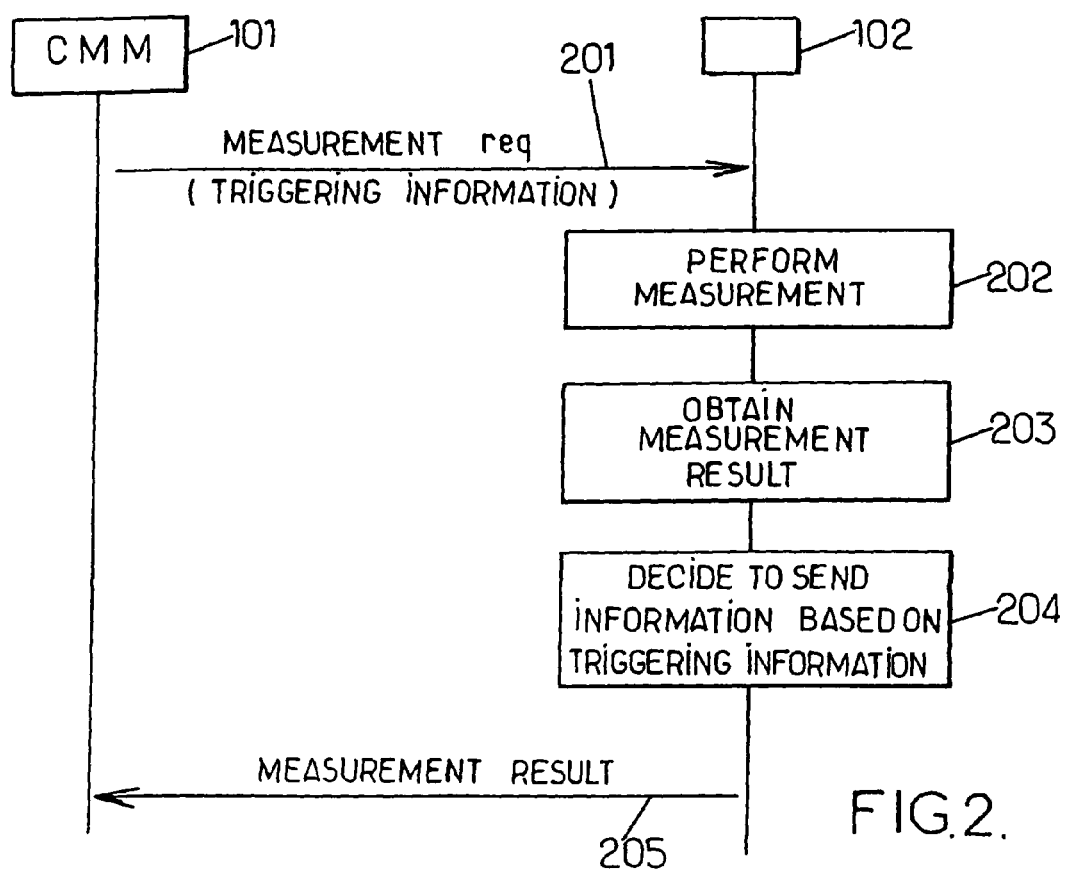
FIG. 2 illustrates a message exchange according to one embodiment of the invention.

FIG. 2 illustrates a messages exchange according to one embodiment of the present invention between the CMM unit 101 and one station 102 among the plurality of stations.

At first, the CMM unit 101 sends to station 102 a measurement request message 201. Such a message is sent in order to request measurement to the station. Of course, it can be sent simultaneously to several stations. The same method, as described below regarding one station 102, can be applied simultaneously on the different stations in the network.

Preferably, such a message indicates the type of measurement which is expected to be performed on the station. It can indicate also a transmission channel on which the indicated type of measurement is to be made.

According to one embodiment of the present invention, this request message comprises a triggering information.

Upon reception of this request message, preferably, station 102 performs a measurement corresponding to the measurement type indicated in the request measurement message, taking into account the start time and the duration time indicated in the request message if present. The FIG. 2 illustrates it at step 202.

At the end of this measurement, station 102 obtains measurement result at step 203.

Then, station 102 decides if at least a part of measurement results is expected to be sent on the basis of the triggering information received in the request message 201.

Depending on this decision, the measurement result or at least a part of the measurement result or none measurement result is sent to the CMM unit, at step 204.

If the station takes the decision to send at least a part of the measurement result, station 102 sends a corresponding message 205 to the CMM unit 101, this message containing the part of the measurement result.

In such conditions, advantageously, the bandwidth consumption relative to the sending of measurement results is limited by selecting either no measurement result or only a part of the measurement results or the whole measurement result to be sent to the CMM unit 101, depending on the triggering information.

FIGS. 3-6 illustrate different formats of measurement request message. These exemplary message formats comprise a first field 301 corresponding to a channel identification or channel number on which station 102 is expected to perform the requested measurement. They further comprise a second field 302 indicating the time at which the measurement is expected to be started. A third field 303 corresponds to the duration of this requested measurement. Moreover, at least a fourth field indicates the triggering information.

This triggering information can advantageously depend on the type of measurement which is requested. Each figure of FIGS. 3-6 illustrates an exemplary given type of measurement.

When a plurality of types of measurement are managed in the network, the measurement request message can further comprise an identification of the type of measurement to be started on the station, in order to make the station able to handle the requested type of measurement.

FIG. 3 illustrates a message format particularly adapted to a type of measurement corresponding to measurements of different sub-types. Thus, for instance, a requested measurement can correspond to a measurement of a first sub-type in order to detect a neighbour cell, to a measurement of a second sub-type in order to detect a neighbour network, to a measurement of a third sub-type in order to detect an unidentified signal, and to a measurement of a fourth sub-type in order to detect a radar signal. In one embodiment, the corresponding measurement results are either equal to 0, to indicate for instance a negative result about a failed detection, or equal to 1, to indicate a positive result about a successful detection.

In this case, the triggering information can advantageously provide information about measurement of which sub-type is requested to be sent after the measurement has been performed by station 102 in case of a successful detection.

Thus, upon reception of this request message, at start time indicated in the field 302 and during the time period indicated in the field 303, station 102 performs measurement. Consequently, at the end of this measurement, station 102 is able to provide a measurement result about each of sub-types. Stated otherwise, station 102 is able to determine if a neighbour network has been detected or not, if a neighbour network has been detected or not, if an unidentified signal has been detected or not, if a radar has been detected or not.

At the end of the measurement, based on triggering information, the station can check which requested sub-type corresponds to a positive result and determine the part of the measurement result to be sent.

In order to request only a part of the measurement result in the measurement request message, CMM unit can advantageously send a triggering information comprising a threshold mask. In this case, each sub-type can correspond to a bit of the mask, and, for instance, if a bit is set to one, it means that the measurement of the corresponding sub-type is requested to be sent in case of positive result. Consequently, when the station has finished its measurement, it checks which bit(s) is set to one and which requested sub-type corresponds to a positive result, in order to determine which part of measurement result is expected to be sent. Such triggering information is included in a field 304.

Of course, such triggering information can be sent in several fields.

FIG. 4 illustrates an exemplary threshold mask field in one embodiment of the present invention. Preferably, this binary mask comprises a first bit 401 corresponding to a first sub-type, a second bit 402 corresponding to a second sub-type, a third bit 403 corresponding to a third sub-type and a fourth bit 404 corresponding to the fourth sub-type as previously described in reference to FIG. 3.

FIG. 5 illustrates another message format corresponding to another type of measurement. The objective of this type of measurement is to give a percentage of time when the medium is sensed busy.

Consequently, the station determines a time period corresponding to a busy time on the channel indicated in the first field 301 during the measurement time period indicated in the third field 303. The corresponding measurement result is preferably represented by a fraction of time.

In this case, the message format comprises a triggering information field 501. This field can advantageously comprise a threshold value corresponding to a fraction of time. Thus, the station is requested to send the measurement result to CMM unit 101 only if this result is higher than the threshold value. Such a threshold value can be a limit below which the measurement result is not considered as a relevant result.

Consequently, the station is able to determine if a measurement result is relevant regarding the threshold value, before it sends it to CMM unit 101.

FIG. 6 illustrates another message format corresponding to another type of measurement. In this type of measurement, the objective is to provide a histogram of signal power received by the station from a start time indicated in field 302 and during the time period indicated in field 303, on the channel indicated in field 301.

For instance, in order to reach this objective, a determined large power range is divided into a plurality of N successive determined power values ranges, noted $P_{range}[i]$, for i=0 to N−1, and station 102 is able to compute a power density value for each power values range of this plurality, N being an integer strictly positive. In such conditions, upon reception of a message requesting this type of measurement, the station computes a power density value for each determined power range.

In this case, it is particularly advantageous to send measurement result only if a significant number of significant power values ranges have significant density level.

To this end, one embodiment of the present invention defines a threshold number, denoted N_Th, and a threshold density value, denoted Density_Th.

Thus, the triggering information can be sent in several fields. A first field 601 can indicate a threshold number and a second field 602 can indicate a threshold density value.

The station can compute a sum value by summing some of the computed density levels while this sum value is less than or equal to the threshold density value. Then, the station decides to send or not to the CMM unit 101 the corresponding measurement result based on a comparison between the number of summed density power levels and the threshold number.

Thus, for instance, the station sends the corresponding measurement to CMM unit when the number of summed density levels is greater than the threshold number. It means that there is enough power values ranges for which the computed density level is relevant.

More precisely, some of the computed density levels are selected out of the density levels provided by the measurement. Such a selection can be performed according to any predetermined rule.

In one embodiment of the present invention, the power values ranges are ordered through increasing way of power values. The station sums a maximum number of computed density levels by beginning with the computed density level corresponding to the highest power values range and going down through the other successive power value ranges to select successively the other computed density level(s), while the sum is less than or equal to the density value threshold.

Stated otherwise, a power level P is computed as the minimum value satisfying the following equation:

$$\sum_{j=P}^{N-1} Hist[j] \geq \text{Density\_Th} \quad (1)$$

Then the measurement result is sent to CMM unit only if the following equation is satisfied:

$$P \geq N\_Th \quad (2)$$

For instance, the large power range is divided into 8 successive power values ranges, $P_{range}(0)$ à $P_{range}(7)$, having respectively a computed density level of 0, 5, 2, 10, 5, 3, 4, 0.

When the first field of the triggering information indicates a number threshold, N_Th, equal to 3, and the second field of the triggering information indicates a density value threshold, Density_Th, equal to 10, the station computes the number P as defined above according to the equation (1) and obtains P equal to 4.

As the equation (2) is satisfied, the station decides to send this measurement result to the CMM unit.

In such conditions, a corresponding measurement result is sent only when measurement results corresponding to at least some of the computed power values ranges are relevant. Thus, the bandwidth consumption relative to the measurement reports purpose can be considerable limited in some conditions.

Figure 7:
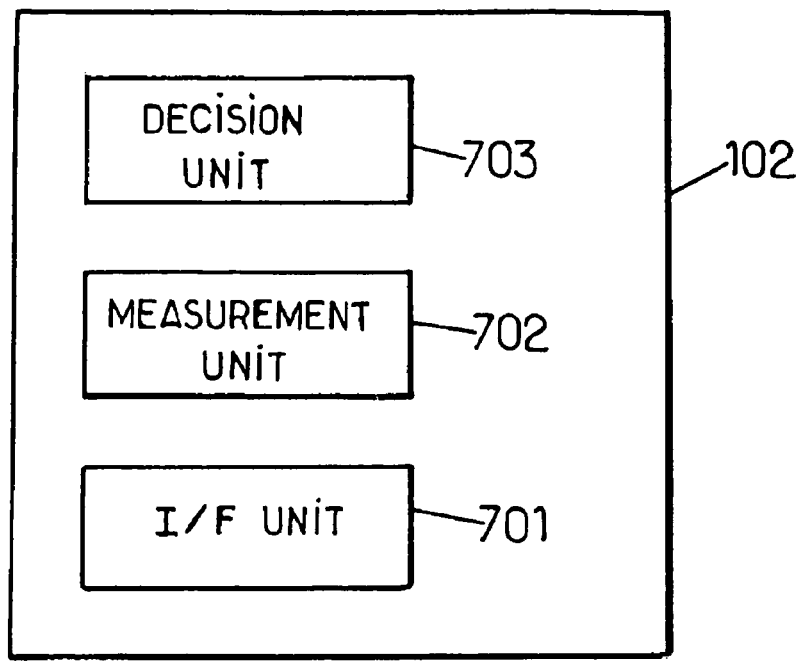
FIG. 7 illustrates a station according to one embodiment of the present invention.

FIG. 7 illustrates a station according to one embodiment of the present invention. Station 102 comprises an interface unit 701 adapted to receive the measurement request message 201 indicating a measurement type and comprising the triggering information:
  a measurement unit 702 adapted to perform the indicated measurement type and to provide a corresponding measurement result, upon reception of the measurement request message 201,
  a decision unit 703 adapted to decide if at least a part of the measurement result is sent to the CMM unit based on the triggering information.

Figure 8:
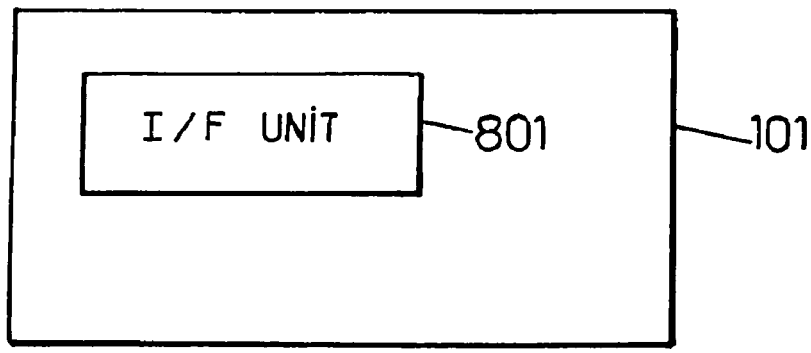
FIG. 8 illustrates a CMM unit according to one embodiment of the present invention.

FIG. 8 illustrates a CMM unit according to one embodiment of the present invention. CMM unit comprises an interface unit 801 adapted to send the measurement request message 201 and to receive the corresponding message 205 to a station in order to request performing a measurement to provide a corresponding result.

One embodiment of the present invention can be applied to any other measurement type by defining the triggering information in relation with it.

One embodiment of the present invention can be carried out in a wireless network based on 802.11.h. In such a network, some measurement types already exist.

To implement one embodiment of the present invention in such existing network, one modification of the format message is required in order to add a triggering information field containing the triggering information.

Another modification can be advantageously carried out in order to allow a backward compatibility. Stated otherwise, such a modification can make the network able to require existing measurement types, which are sent when they are performed, and able to require new measurement types which are sent only if some conditions are satisfied regarding the triggering information, according to one embodiment of the present invention.

Such a modification can be carried out by adding new measurement type identifiers to existing ones.

Thus, an existing station can ignore a measurement request message when this message indicates a measurement type identifier which is not known by the station, more precisely which is a new measurement type identifier.

Finally, one embodiment of the present invention can be carried out easily in an existing wireless network and advantageously allows to save transmission bandwidth.

Of course, it is easy to deduce from the previous description, one embodiment of the present invention which is adapted to other types of measurement, notably for types of measurement as defined by the 802.11k protocol, standardized by IEEE.

The invention claimed is:

1. A method for managing signal measurements at a station operating in a wireless network comprising at least said station and a Centralised Measurement Manager (CMM) unit, said method comprising:
receiving, at said station, a measurement request message including measurement parameters and trigger parameters, the measurement request message requesting said station to measure at least one channel characteristic based on the measurement parameters, the measurement parameters specifying at least a channel identifier indicating a transmission channel to be measured, a measurement start time, and a measurement duration, and the trigger parameters including at least a trigger value and a trigger number;
measuring the at least one channel characteristic of the transmission channel to be measured corresponding to the received channel identifier starting at a time period specified by the measurement start time and continuing during a time period specified by the measurement duration, to obtain measurement results for the at least one channel characteristic;
determining a number of the measurement results that satisfy a condition of the trigger value to produce a number of satisfied conditions;
comparing the number of satisfied conditions to the trigger number to obtain a trigger result indicating whether the number of satisfied conditions is equal to or greater than the trigger number; and
transmitting an indication of or at least part of the measurement results to said CMM unit based on the trigger result.

2. The method according to claim 1, wherein
the at least one channel characteristic includes a time period during which a channel is busy for a given duration,
the measuring comprises measuring an amount of time during which the channel is busy for the given duration, and
the determining comprises determining whether the amount of time during which the channel is busy is equal to or greater than a time period specified by the trigger value.

3. The method according to claim 1, wherein
the at least one channel characteristic includes a density level for each of a plurality of ranges of power density,
the measuring comprises measuring a power density value of each density level, and
the determining comprises determining whether the power density value of each density level is equal to or greater than the trigger value.

4. The method according to claim 3, wherein
the determining further comprises
sorting the power density value of each density level in an increasing order of power density, and
comparing the power density values of the density levels with the trigger value starting with the density level having the highest power density value.

5. The method according to claim 1, wherein the wireless network is based on the 802.11h protocol, standardized by the Institute of Electrical and Electronics Engineers (IEEE).

6. The method according to claim 1, wherein the station further comprises the CMM unit.

7. The method according to claim 1, wherein
the trigger value includes a binary mask comprising a plurality of bits, each of the plurality of bits being associated with a channel characteristic to be measured, and
the transmitting comprises transmitting only a part of the measurement results that satisfy conditions associated with values of the plurality of bits.

8. A communication station configured to cooperate with a Centralised Measurement Manager (CMM) unit in order to manage measurements in a wireless network, said station comprising:
an interface unit configured to receive a measurement request message including measurement parameters and trigger parameters, the measurement request message requesting said station to measure at least one channel characteristic based on the measurement parameters, the measurement parameters specifying at least a channel identifier indicating a transmission channel to be measured, a measurement start time, and a measurement duration, and the trigger parameters including at least a trigger value and a trigger number;
a measurement unit configured to measure the at least one channel characteristic of the transmission channel to be measured corresponding to the received channel identifier starting at a time period specified by the measurement start time and continuing during a time period specified by the measurement duration, to obtain measurement results for the at least one channel characteristic; and
a decision unit configured to determine a number of the measurement results that satisfy a condition of the trigger value to produce a number of satisfied conditions, to compare the number of satisfied conditions to the trigger number to obtain a trigger result indicating whether the number of satisfied conditions is equal to or greater than the trigger number, and to transmit an indication of or at least part of the measurement results to said CMM unit based on the trigger result.

9. The station according to claim 8, wherein
the trigger value includes a binary mask comprising a plurality of bits, each of the plurality of bits being associated with a channel characteristic to be measured, and
the decision unit is further configured to transmit only a part of the measurement results that satisfy conditions associated with values of the plurality of bits.

10. The station according to claim 8 or claim 9, wherein
the at least one channel characteristic includes a time period during which a channel is busy for a given duration,
the measurement unit is configured to measure an amount of time during which the channel is busy for the given duration, and the decision unit is configured to determine whether the amount of time during which the channel is busy is equal to or greater than a time period specified by the trigger value.

11. The station according to claim 8 or 9, wherein
the at least one channel characteristic includes a density level for each of a plurality of ranges of power density,
the measurement unit is configured to measure a power density value of each density level, and
the decision unit is configured to determine whether the power density value of each density level is equal to or greater than the trigger value.

12. A Centralised Measurement Manager (CMM) unit configured to handle measurements in a wireless network comprising at least one station configured to perform the measurements, said CMM unit comprising:
an interface unit configured to transmit a measurement request message to said at least one station and to receive an indication of or the at least part of measurement results from said at least one station, the measurement request message including measurement parameters and trigger parameters and requesting said at least one station to measure at least one channel characteristic based on the measurement parameters and to obtain the measurement results, the measurement parameters specifying at least a channel identifier indicating a transmission channel to be measured, a measurement start time, and a measurement duration, and the trigger parameters including at least a trigger value and a trigger number, the trigger value specifying a condition to be satisfied by the measurement results and the trigger number specifying a number of measurement results that satisfy the condition before the indication of or at least part of the measurement results are transmitted,
the measurement results being measured by said at least one station on the transmission channel to be measured corresponding to the received channel identifier starting at a time period specified by the measurement start time and continuing during a time period specified by the measurement duration.

* * * * *